(12) United States Patent
Nakai

(10) Patent No.: US 6,650,477 B2
(45) Date of Patent: Nov. 18, 2003

(54) DIFFRACTIVE OPTICAL ELEMENT AND OPTICAL APPARATUS HAVING THE SAME

(75) Inventor: Takehiko Nakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,629

(22) Filed: Jun. 4, 2001

(65) Prior Publication Data

US 2002/0015232 A1 Feb. 7, 2002

(30) Foreign Application Priority Data

Jun. 7, 2000 (JP) .................................... 2000-171168

(51) Int. Cl.[7] ................................................ G02B 5/18
(52) U.S. Cl. ..................... 359/569; 359/566; 359/565; 359/576
(58) Field of Search ............................ 359/569, 565, 359/566, 572, 576

(56) References Cited

U.S. PATENT DOCUMENTS

| 5,044,706 A |   | 9/1991 | Chen |
| 5,151,826 A | * | 9/1992 | Pasco ......................... 359/742 |
| 5,161,057 A | * | 11/1992 | Johnson ....................... 359/566 |
| 5,581,405 A | * | 12/1996 | Meyers et al. ............... 359/569 |
| 5,737,113 A |   | 4/1998 | Kuramochi et al. |
| 5,790,321 A |   | 8/1998 | Goto |
| 6,317,268 B1 | * | 11/2001 | Harrigan ...................... 359/558 |

FOREIGN PATENT DOCUMENTS

| JP | 4-213421 | 8/1992 |
| JP | 6-324262 | 11/1994 |

OTHER PUBLICATIONS

Londoño, et al., "The Design of Achromatized Hybrid Diffractive Lens Systems," SPIE vol. 1354, International Lens Design Conference, pp. 30–37 (1990).

Kathman, et al., "Binary Optics in Lens Design," SPIE vol. 1354, International Lens Design Conference, pp. 297–309 (1990).

Wood, "Using Hybrid Refractive–Diffractive Elements in Infrared Petzval Objectives," SPIE vol. 1354, International Lens Design Conference, pp. 316–322 (1990).

* cited by examiner

Primary Examiner—John Juba
Assistant Examiner—Fayez Assaf
(74) Attorney, Agent, or Firm—Fitzpatrick, Cella, Harper & Scinto

(57) ABSTRACT

A diffractive optical element includes a diffraction optical part provided with a phase-type diffraction grating. The diffraction grating of the diffraction optical part has on the surface thereof minute uneven structure of which the period is substantially constant. The period is smaller than a wavelength used.

8 Claims, 8 Drawing Sheets

DIFFRACTIVE OPTICAL ELEMENT AND OPTICAL APPARATUS HAVING THE SAME

BACKGROUND OF THE INVENTION

1. Field of the Invention

This invention relates to a diffractive optical element, and particularly to a diffractive optical element for use with light of a plurality of wavelengths or bands, and an optical system and an optical apparatus using the same.

2. Related Background Art

In a refracting optical system, use has heretofore been made of a method of decreasing chromatic aberration by a combination of glass materials differing in dispersion. In contrast, a method of decreasing chromatic aberration by providing a diffractive optical element having the diffracting action on a lens surface or in a portion of an optical system is disclosed in such literature as SPIE, Vol. 1354, International Lens Design Conference (1990), Japanese Patent Application Laid-Open No. 4-213421 (corresponding U.S. Pat. No. 5,044,706), Japanese Patent Application Laid-Open No. 6-324262 (corresponding U.S. Pat. No. 5,790,321), etc.

Further, a diffractive optical element as shown in FIG. 12 of the accompanying drawings is proposed as a diffractive optical element for use in an optical system. This diffractive optical element is of a construction in which a first diffraction optical part 2 having a phase-type diffraction grating 6 formed on a substrate 4 and a second diffraction optical part 3 having a phase-type diffraction grating 7 formed on a substrate 5 are disposed in proximity to each other with an air layer 8 interposed therebetween. The diffraction grating 6 and the diffraction grating 7 are formed of materials differing in dispersion value. This diffractive optical element is characterized in that it also is a diffractive optical element through the whole layer.

The diffraction efficiency of this diffractive optical element is shown in FIG. 13 of the accompanying drawings. In a laminated-type diffraction grating having a plurality of layers of diffraction gratings shown in FIG. 12, high diffraction efficiency can be maintained in the entire visible region as shown in FIG. 13 by suitably setting the material forming the diffraction gratings of respective layers and the grating height. Now, in FIG. 13, diffraction efficiency is shown as the rate of the design order diffracted light to the whole transmitted beam. Actually, however, Fresnel reflection occurs in the boundary between the air and the surface of the diffraction grating and therefore, in an interface, diffraction efficiency is reduced by several % in the entire wavelength region.

Accordingly, taking the Fresnel reflection on the interfaces between the air layer and the respective diffraction gratings into account, the diffraction efficiency of the whole is reduced by nearly 10% in the construction of FIG. 12.

In order to regulate this reduction in diffraction efficiency, it would come to mind to provide anti-reflection coating in the boundary between the air layer and the surface of the grating.

However, when anti-reflection coating is vapor-deposited on the boundary between the air layer and the surface of the grating, the following various problems arise.

Firstly, from the ease of preparation of the grating shape, a polymeric resin material is often used for a diffraction grating, and there is a problem attributable thereto. That is, it is that the polymeric resin material is weak to heat and therefore the vapor deposition of anti-reflection film is impossible at high temperature and the adhesion force of the coating tends to become weak.

Secondly, it can be mentioned that an edge portion is present on the grating and therefore it is difficult to vapor-deposit anti-reflection coating uniformly. This causes the diffraction efficiency to be reduced because as shown in FIG. 14 of the accompanying drawings, the grating shape after the coating has been vapor-deposited does not become a desired shape. To obtain a desired anti-reflection characteristic, it is necessary a multilayer coating construction, and the deformation of the grating shape becomes more remarkable as the number of coating layers is increased and therefore, it is considerably difficult to effect anti-reflection and yet improve the diffraction efficiency.

On the other hand, as opposed to forming the anti-reflection coating as previously described by vapor deposition, there is known a proposition to provide sub-wavelength grating structures used to thereby give an anti-reflection effect, as shown in such literature as J. Opt. Soc. Am A/Vol. 13, No. 5/pp. 988–992/1996 and FIG. 4B of U.S. Pat. No. 5,581,405.

SUMMARY OF THE INVENTION

So, the present invention has as its object to solve the above-noted problems and to provide an inexpensive and highly accurate diffractive optical element which has a construction excellent in manufacture and which can greatly reduce the reflection on the surface of a diffraction grating and can maintain high diffraction efficiency.

In order to achieve the above object, a diffractive optical element according to an embodiment of the present invention has a diffraction optical part provided with a phase type diffraction grating, and is characterized in that the diffraction grating of the diffraction optical part has on the surface thereof minute uneven structure of which the period is substantially constant and the period is smaller than a wavelength used.

Also, a diffractive optical element according to the present invention from another point of view has a first diffraction optical part provided with a phase type diffraction grating, and a second diffraction optical part provided with a phase type diffraction grating formed of a material differing from that of the first diffraction optical part, and is characterized in that at least one of the diffraction gratings of the first diffraction optical part and the second diffraction optical part has on the surface thereof minute uneven structure smaller than a wavelength used.

DESCRIPTION OF THE PREFERRED EMBODIMENTS (Embodiment 1)

Figure 1:
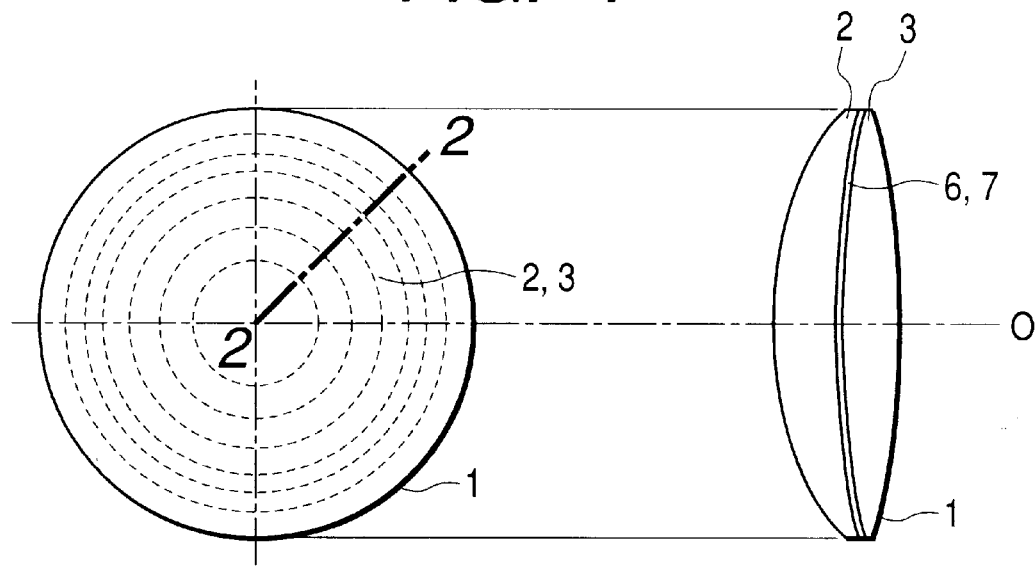
FIG. 1 shows the construction of a diffractive optical element according to Embodiment 1.
Figure 2:
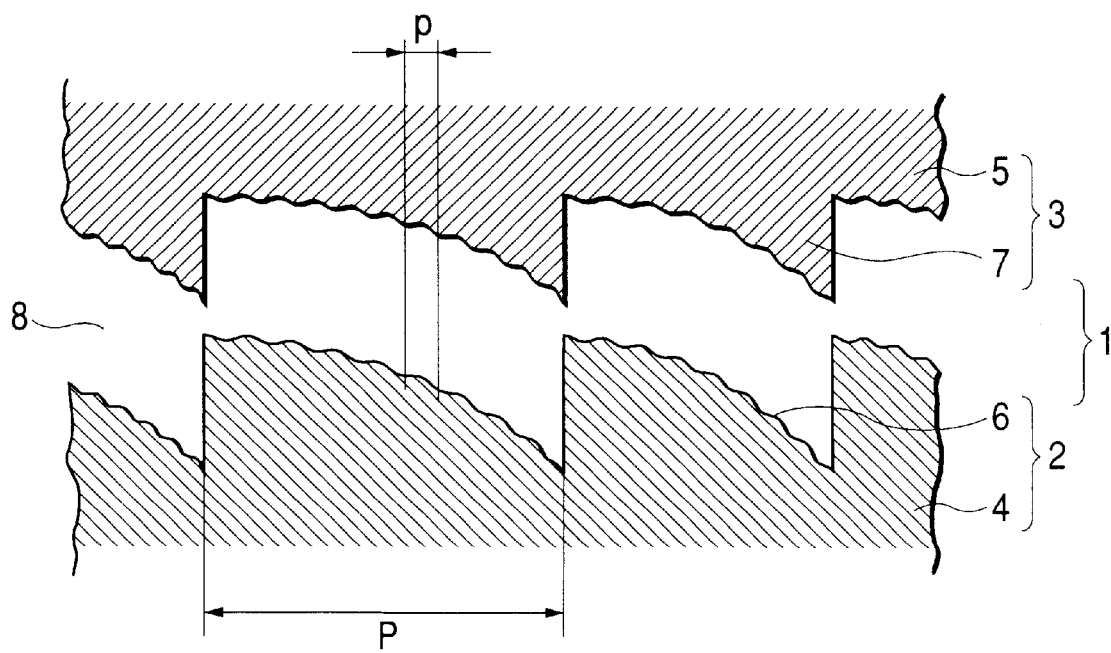
FIG. 2 is an enlarged view partly in cross-section of the diffractive optical element according to Embodiment 1.

FIG. 1 is a front view and a side view of a diffractive optical element according to Embodiment 1 of the present invention. The diffractive optical element 1 is of a construction in which a first diffraction optical part 2 and a second diffraction optical part 3 are disposed in proximity to each other with an air layer interposed therebetween. Concentric circular phase-type diffraction gratings are formed on those surfaces of the first and second diffraction optical parts 2 and 3 which are adjacent to the air layer. FIG. 2 shows a portion of a cross-sectional shape of the diffractive optical element 1 of FIG. 1 taken along the line 2–2 of FIG. 1. FIG. 2 is a deformed view in which the grating height is depicted higher than the actual height.

As shown in FIG. 2, the first diffraction optical part 2 has concentric circular phase-type diffraction gratings 6 formed on a substrate 4, and the second diffraction optical part 3 has concentric circular phase-type diffraction gratings 7 formed on a substrate 5. The reference numeral 8 designates the air layer, and the first and second diffraction optical parts 2 and 3 are disposed in proximity to each other with this air layer 8 interposed therebetween. This diffractive optical element acts as a diffractive optical element 1 through the whole layer. Also, the diffraction gratings 6 and 7 of the first diffraction optical part 2 and the second diffraction optical 3, respectively, are formed of different materials.

By adopting such a construction, the technique of making a diffractive optical element of a single layer can be used for the gratings of the respective diffraction optical parts. Also, when a diffraction grating is to be formed in the boundary between two materials, it is necessary to use materials which satisfy not only optical characteristic but also various characteristics such as adhering property and expansion coefficient, whereas in a diffractive optical element of laminated structure with an air layer interposed as in the present embodiment, basically optical characteristic alone need be satisfied and therefore, the selective range of materials becomes wide, and this is advantageous for the making of the element. The feature of the diffractive optical element according to the present embodiment is that periodic structure smaller than the grating pitch and smaller than the wavelength used is formed on the surfaces of the diffraction gratings 6 and 7. The periods of this minute periodic structure are designed to be equal to each other.

The diffraction efficiency of the diffractive optical element according to the present embodiment is basically the same as that of the conventional example and therefore need not be described in detail, and the anti-reflection characteristic which is the main object of the present invention will hereinafter be described in detail. For minute periodic structure to exhibit the anti-reflection characteristic, it is necessary that the period thereof be sufficiently small relative to the wavelength used. Specifically, the expression of diffraction is represented as follows and therefore, such a period that only zero order diffracted light materializes as propagating light can be selected.

$$n2(\lambda)\sin\theta2 - n1(\lambda)\sin\theta1 = m\lambda/p \quad (1)$$

where n1($\lambda$) and n2($\lambda$) represent the refractive indices of the incidence side material and the emergence side material, respectively, for light of a wavelength $\lambda$, $\theta1$ represents the angle of incidence, $\theta2$ represents the angle of emergence (the angle of diffraction), m represents the diffraction order, $\lambda$ represents the wavelength used, and p represents the period (pitch) of minute periodic structure.

The description will be complemented by a simple example of numerical values. The wavelength used is 400 nm, the refractive index of the incidence side material for light of that wavelength is n1($\lambda$=400 nm)=1.0, and the refractive index of the emergence side material for the same light is n2($\lambda$=400 nm)=1.5. Consider a case where a beam is perpendicularly incident on the surface on which the minute periodic structure is provided ($\theta1=0°$). When m=1 and the angle of emergence (the angle of diffraction) is 90°, from expression (1), the period p of the minute periodic structure is p=0.27 $\mu$m. Accordingly, if the grating pitch p is p=0.27 $\mu$m or less, there is no solution of expression (1) and therefore, diffracted lights of first order and higher orders (absolute values) by the minute periodic structure are not created. The beam propagating behind the minute periodic structure is zero order diffracted light alone. The expression of the defraction of zero order diffracted light is the case of m=0 in expression (1), and this is equivalent to Snell's expression in refraction. That is, the propagation on the grating surface within each pitch of the diffraction gratings of the diffraction optical parts shown in FIG. 2 is propagation of the same state as that when the minute periodic structure is absent. Accordingly, the diffraction by the diffraction gratings of the diffraction optical parts is not affected by the minute periodic structure and can be handled as the state of independent diffraction.

As described above, to form minute periodic structure on the grating surfaces of the diffraction gratings to thereby exhibit a good anti-reflection characteristic, it is necessary to determine the minute period so that the period (pitch) of the minute periodic structure may materialize within the range of the angle of incidence on each grating surface in the entire region of the wavelength used so as to satisfy the above-described state.

In the diffractive optical element of laminated structure like the present embodiment, the grating surfaces of the respective diffraction optical parts are disposed in proximity to each other and therefore, the irregularity of the angle of incidence of the beam incident on each grating pitch may be considered to be substantially equal. Strictly, the grating heights differ and therefore the angles of incidence differ and thus, the period of the minute periodic structure necessary for each grating differs. However, the period of the minute periodic structure found as previously described can be equal to or less than that and therefore, even if it is adjusted to a smaller period, the value of the period of the minute periodic structure will not change greatly. So, taking the ease of manufacture of a minute period into account, it is preferable that pitches be equal in the diffraction gratings of the respective diffraction optical parts.

Figure 4:
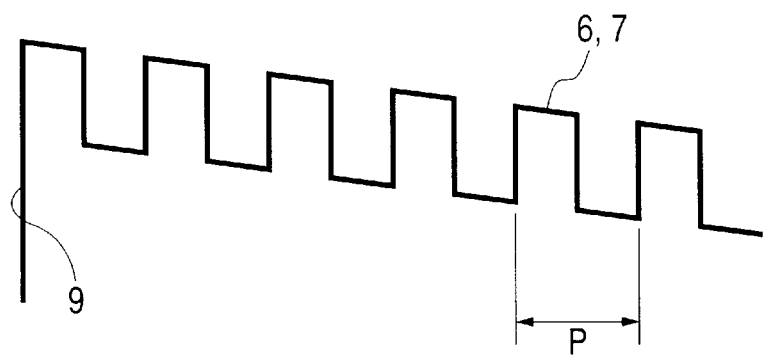
FIG. 4 shows an example of minute periodic structure.
Figure 5:
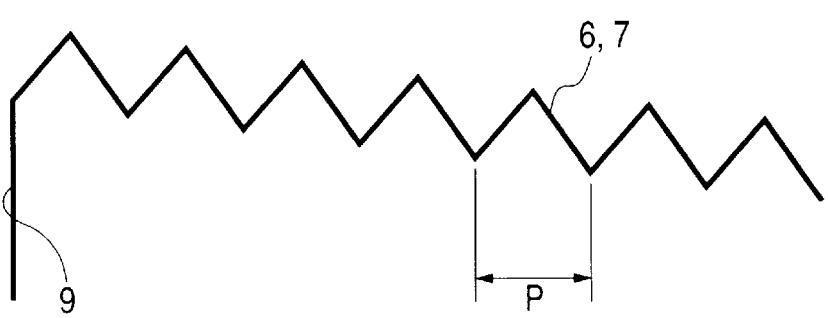
FIG. 5 shows another example of the minute periodic structure.
Figure 6:
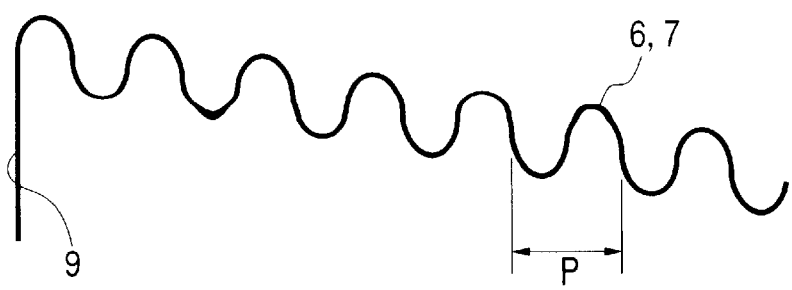
FIG. 6 shows another example of the minute periodic structure.

Further, it is also preferable in manufacture that the shape of the minute periodic structure formed on each grating be the same. As minute structure having the anti-reflection effect, there are known various shapes such as a rectangular wave shape, a triangular wave shape and a sine wave shape as shown in FIGS. 4 to 6. Further, as periodic structure, there are a construction which is periodic only in one-dimensional direction and a construction which is periodic in two-dimensional directions orthogonal to each other. These shape of the minute periodic structure should be suitably selected from the viewpoint of performance as well as from the method of manufacture. In the case of a diffractive optical element of laminated structure, the corresponding grating pitches of the diffraction gratings of respective layers may be regarded as being the same, and the shapes of the gratings, although differing in convexo-concave, are of the same order in terms of the grating depth (height). Accordingly, it is preferable from the viewpoints of cost and efficiency that the minute periodic structure to be formed on the surface of each grating be made by the same manufacturing method, and for this purpose, it is desirable that the minute periodic structure be of the same shape.

Figure 3:
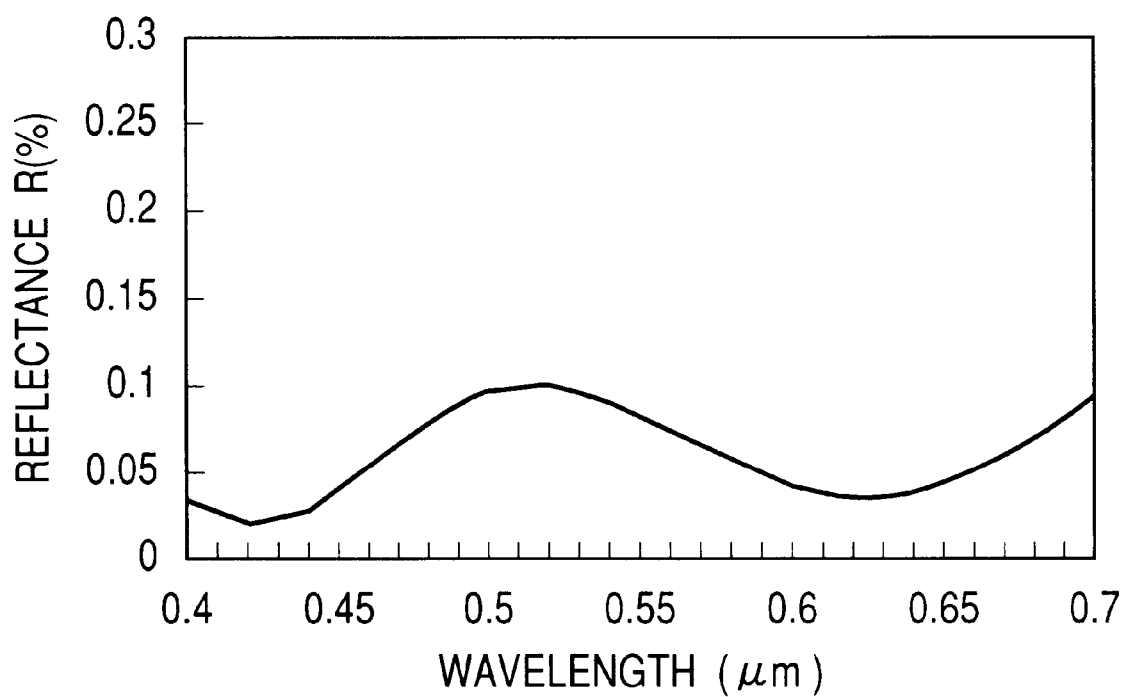
FIG. 3 is a graph showing the reflectance of the minute periodic structure of Embodiment 1.

FIG. 3 shows the anti-reflection characteristic when as minute periodic structure, the triangular wave shape as shown in FIG. 5 is formed on the surface of the grating. Let it be assumed that the period of the minute periodic structure is 0.2 μm and the depth thereof is 0.5 μm and that this minute periodic structure is formed on the surface of a diffraction grating formed of ultraviolet setting resin C001 (nd=1.524, vd=50.8) produced by Dainippon Ink Chemical Industry, Ltd. FIG. 3 shows the reflectance for each wavelength when a non-polarized beam is incident on the surface of this grating from a direction perpendicular thereto. Usually, on a surface not subjected to anti-reflection treatment, a material having a refractive index in the vicinity of 1.5 causes reflection of 4 to 5%. Accordingly, it can be seen that by the minute periodic structure being formed on the surface of the diffraction grating, reflected light is restrained well.

(Embodiment 2)

Figure 7A:
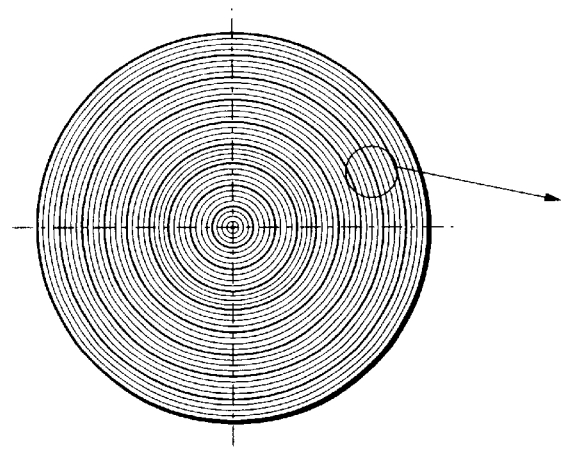
FIGS. 7A and 7B show the minute periodic structure of a diffractive optical element according to Embodiment 2.
Figure 7B:
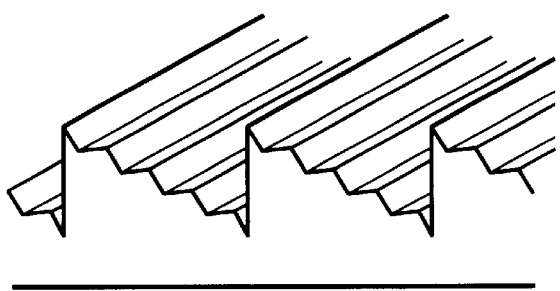

In Embodiment 2, design is made such that as shown in FIG. 7B, the minute periodic structure has periodic structure in a direction parallel to the direction (circumferential direction) in which the diffraction gratings extend. In Embodiment 1, regarding the relation between the grating parts of the diffractive optical element and the minute periodic structure, they are handled as being entirely independent of each other. It is true regarding the anti-reflection performance and the diffraction performance, but when the manufacture of the element is taken into consideration, it is more preferable in both of manufacture and performance to make the minute periodic structure with the shape of the surface of the grating of the diffractive optical element taken into account. Specifically, it is good to construct the minute periodic structure so as to extend in parallelism to the direction in which the grating of the diffractive optical element extends, as shown in FIG. 7B.

Figure 8A:
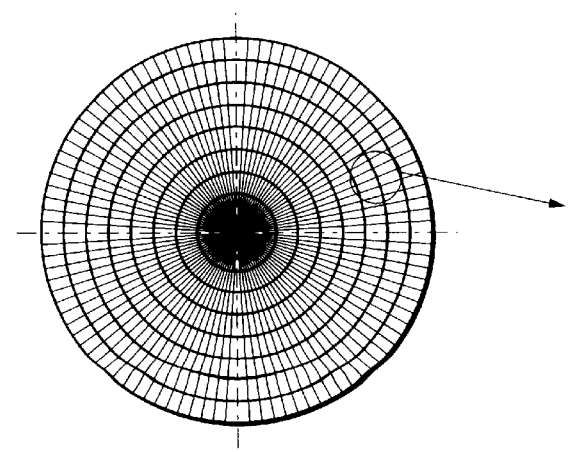
FIGS. 8A and 8B show minute periodic structure for illustrating in contrast with Embodiment 2.
Figure 8B:
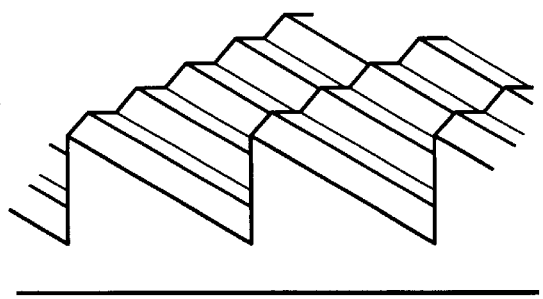

As the periodic structure, minute periodic structure extending in a direction (diametral direction) orthogonal to the direction in which the gratings extend, as shown in FIG. 8B, is also conceivable, but in this case, minute periodic structure is formed on the tip ends (edge portions) of the gratings and the vertical surfaces (sides) of the gratings and therefore, it becomes difficult to form it well.

Also, when minute periodic structure is formed on the surfaces of concentric circular diffraction gratings, there is provided structure in which the period is small on the central side of the diffractive optical element and becomes great on the outer peripheral side thereof and this becomes considerably difficult to manufacture. In contrast, if as shown in FIG. 7B, minute periodic structure is formed so as to become parallel to the grating pitch of the surfaces of the gratings of the diffractive optical element of the present invention, the period of the minute periodic structure will become constant at the center and periphery of the element, and this is considerably advantageous in manufacture.

(Embodiment 3)

Figure 9:
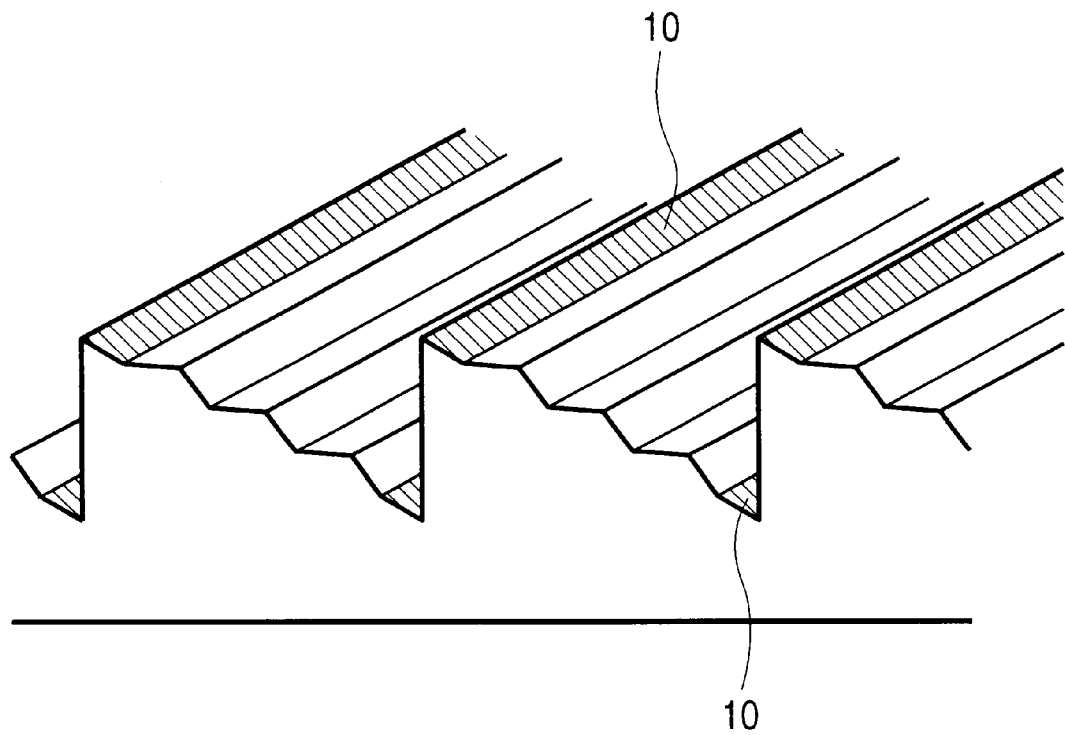
FIG. 9 shows the minute periodic structure of a diffractive optical element according to Embodiment 3.

In Embodiment 3, as shown in FIG. 9, design is made such that areas in which minute periodic structure is not formed are provided near the end portions (edge portions) of the surfaces of the gratings of the diffractive optical element. It is desirable that the anti-reflection structure by the above-described minute periodic structure be provided on the entire surface area of the diffraction gratings. However, if by the minute periodic structure being formed, the grating shape is not formed well and the diffraction efficiency is reduced, the advantage of improving the diffraction efficiency by the anti-reflection effect will be greatly curtailed. When a diffractive optical element having laminated structure is constructed so that diffraction optical parts may be proximate to each other with an air layer interposed therebetween, the reduction in the diffraction efficiency of the diffractive optical element by the deformation of the edge portions of the gratings is remarkable.

So, in the present embodiment, as shown in FIG. 9, areas 10 in which the minute periodic structure of the present invention is not provided are provided near the edge portions of the surfaces of the gratings, whereby the anti-reflection effect is improved as much as possible while the diffraction efficiency is maintained. If the areas in which the minute periodic structure is not provided are 10% or less of the grating pitch of the diffractive optical element, the anti-reflection effect will be obtained sufficiently and therefore, it is preferable to set the areas to that percentage with manufacture taken into consideration.

(Embodiment 4)

Figure 10:
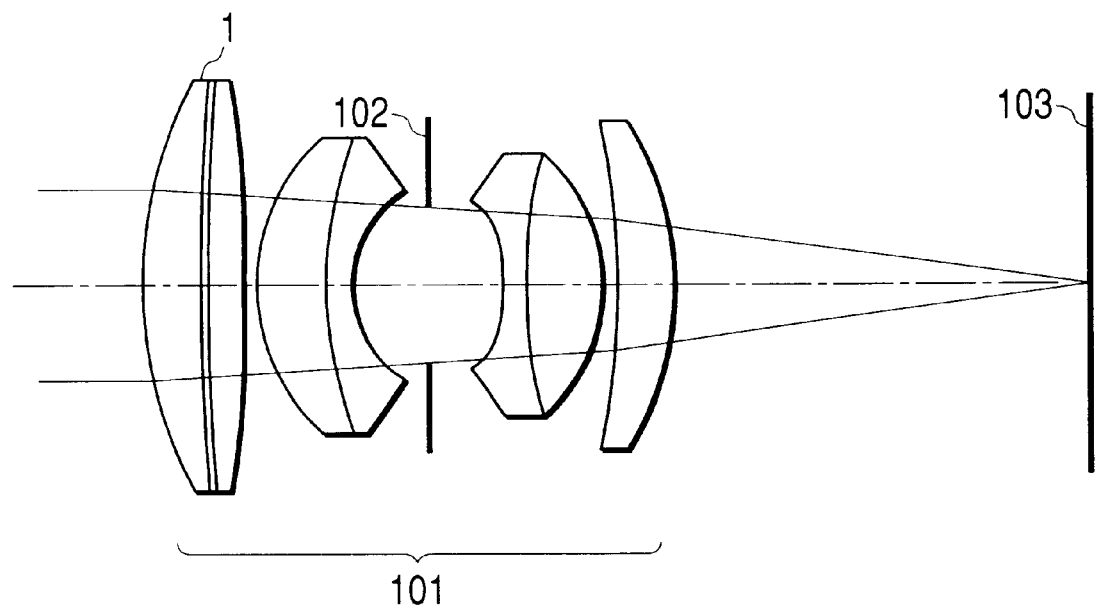
FIG. 10 shows a photographing optical system in Embodiment 4.

Embodiment 4 of the present invention is shown in FIG. 10. FIG. 10 shows a cross-section of the photographing optical system of a camera or the like, and in FIG. 10, the reference numeral 101 designates a taking lens having a stop 102 and the diffractive optical element 1 of the present invention therein. The reference numeral 103 denotes an imaging plane on which silver salt film or an image pickup element such as a CCD is disposed. By the diffractive optical element of the present invention being used, the wavelength dependency of diffraction efficiency and unnecessary diffracted lights are greatly improved and therefore, there is obtained a taking lens of high performance which suffers little from flare and is high in the resolving power at low frequencies. Also, the diffractive optical element of the present invention can be made by a simple manufacturing method and therefore, there can be provided an inexpensive optical system excellent in mass productivity as a photographing optical system.

While in FIG. 10, the diffractive optical element of the present invention is provided on the cemented surface of the foremost lens, this is not restrictive, but the diffractive optical element may be provided on the surface of the lens, or a plurality of diffractive optical elements of the present invention may be used in the taking lens.

Also, which in the present embodiment, the case of the taking lens of a camera has been shown, this is not restrictive, but a similar effect will be obtained even if the diffractive optical element of the present invention is used in an imaging optical system used in a wide wavelength region such as the taking lens of a video camera, the image scanner of a business machine or the reader lens of a digital copier.

(Embodiment 5)

Figure 11:
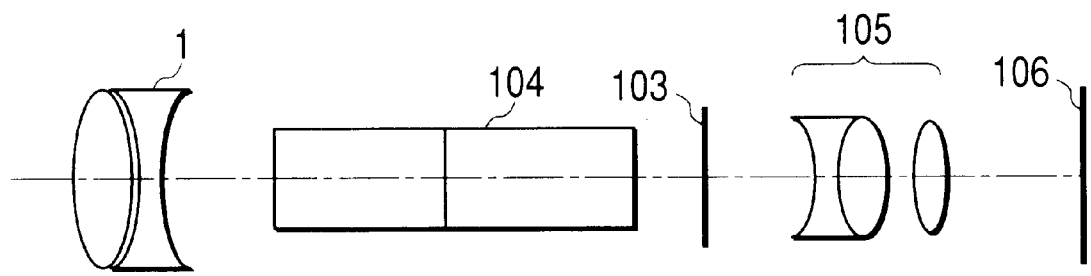
FIG. 11 shows an observation optical system in Embodiment 5.
Figure 12:
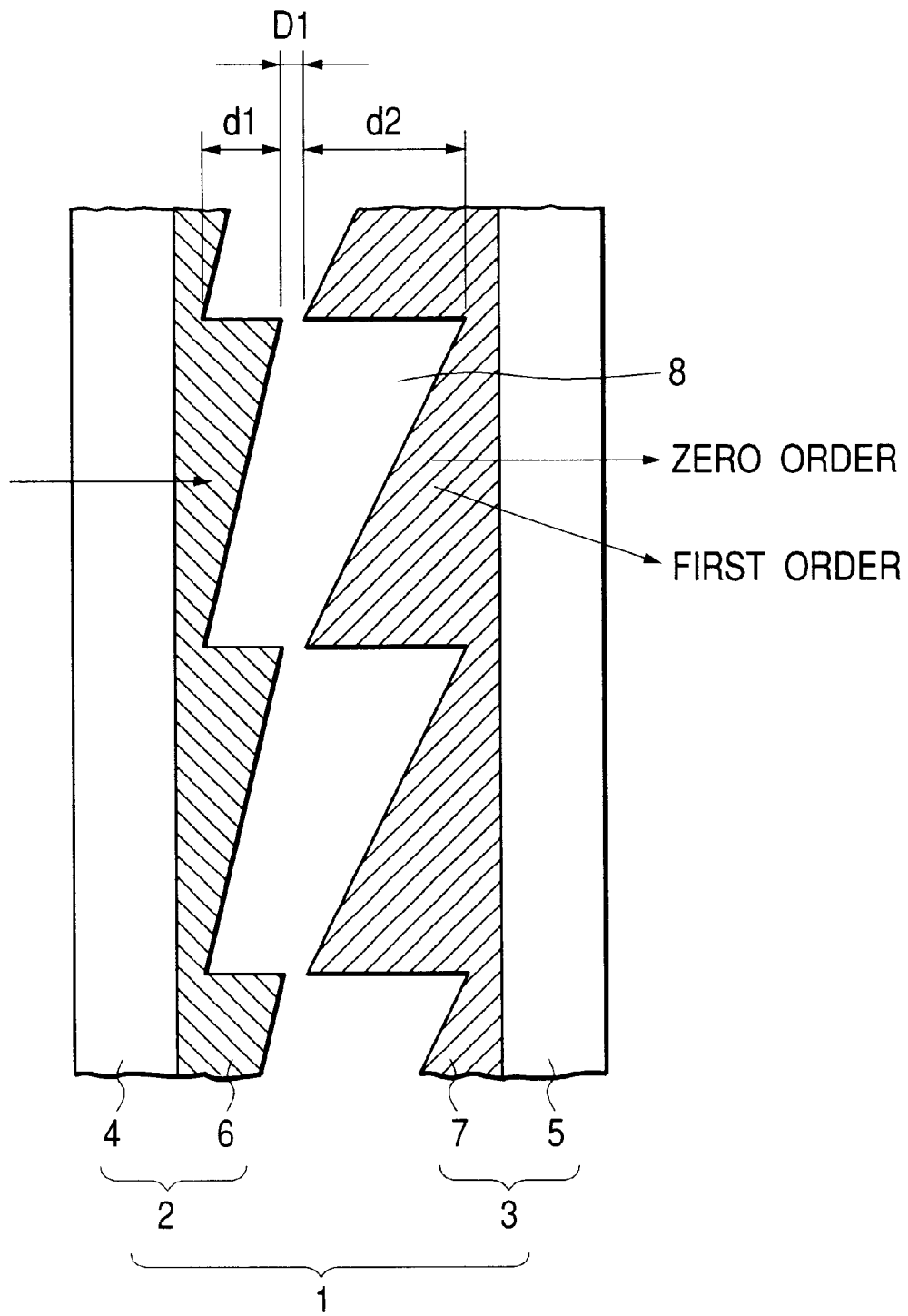
FIG. 12 shows a cross-sectional shape of a laminated type diffractive optical element according to the prior art.
Figure 13:
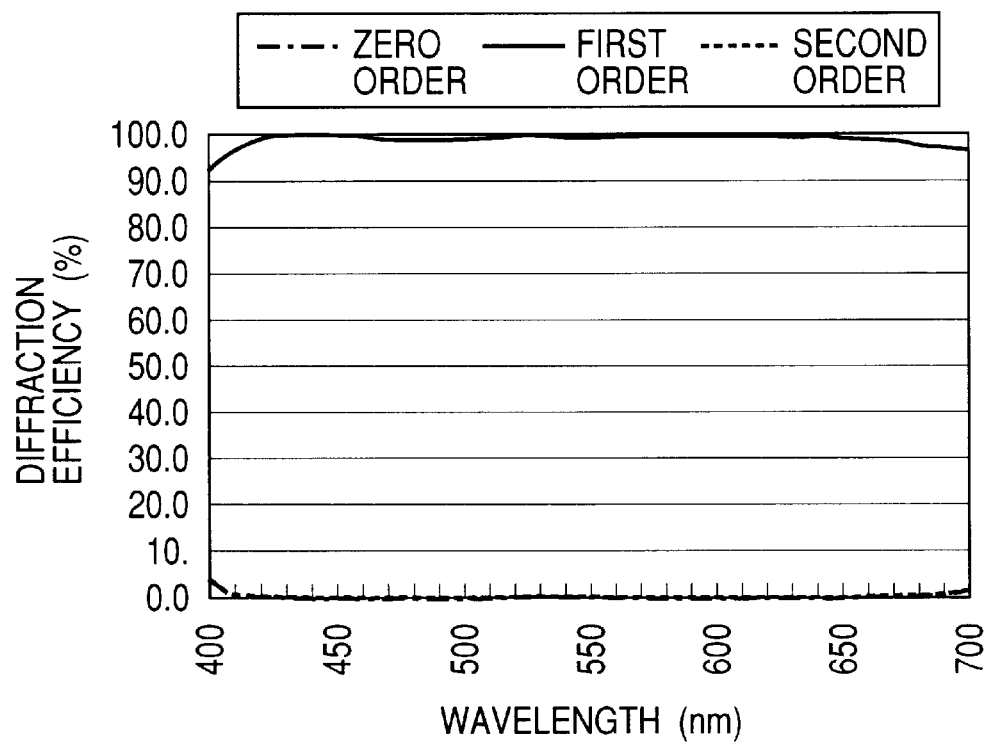
FIG. 13 shows the diffraction efficiency of the laminated type diffractive optical element according to the prior art.
Figure 14:
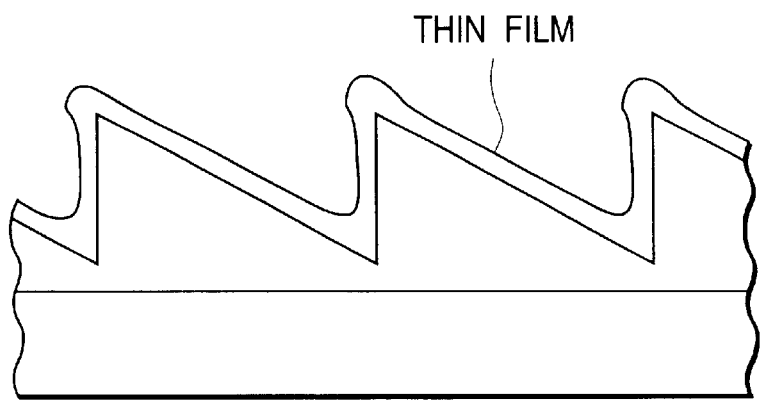
FIG. 14 shows a cross-sectional shape of anti-reflection film.

Embodiment 5 of the present invention is shown in FIG. 11. FIG. 11 shows a cross-section of the observation optical system of binoculars or the like. The reference numeral 1 designates an objective lens which is a diffractive optical element, the reference numeral 104 denotes a prism for materializing an image, the reference numeral 105 designates an eyepiece, and the reference numeral 106 denotes an evaluation plane (pupil plane). A diffractive optical element 1 is formed for the purpose of correcting chromatic aberration, etc. in the imaging plane 103 of the objective lens.

By the diffractive optical element of the present invention being used, the wavelength dependency of diffraction efficiency and unnecessary diffracted lights are greatly improved and therefore, there is obtained an objective lens of high performance which suffers little from flare and is high in the resolving power at low frequencies. Also, the diffractive optical element of the present invention can be made by a simple manufacturing method and therefore, there can be provided an inexpensive optical system excellent in mass productivity as an observation optical system.

While in the present embodiment, there has been shown a case where the diffractive optical element is formed in the objective lens portion, this is not restrictive, but a similar effect will be obtained even if the diffractive optical element is formed on the surface of the prism or in the eyepiece. However, by the diffractive optical element being provided more adjacent to the object side than to the imaging plane, there is the effect of reducing chromatic aberration in only the objective lens and therefore, in the case of a macroscopic observation system, it is desirable to provide the diffractive optical element adjacent to at least the objective lens.

Also, while in the present embodiment, there has been discussed the case of binoculars, this is not restrictive, but the diffractive optical element of the present invention may also be used in a terrestrial telescope, an astronomic observation telescope or the like, and a similar effect will be obtained even in the case of the optical type-finder of a lens shutter camera, a video camera or the like.

What is claimed is:

1. A laminated-type diffractive optical element comprising:

a first diffraction optical part provided with a phase-type diffraction grating; and a second diffraction optical part provided with a phase-type diffraction grating;

wherein said laminated-type diffractive optical element has high diffraction efficiency in a desired used wavelength region by making a material forming the phase-type diffraction grating of said first diffraction optical part different from a material forming the phase-type diffraction grating of said second diffraction optical part, at least one of the diffraction gratings of said first diffraction optical part and said second diffraction optical part has on the surface thereof minute uneven structure smaller than a predetermined wavelength in the used wavelength region, and said first diffraction optical part and said second diffraction optical part are disposed in proximity to each other with an air layer interposed therebetween.

2. The diffractive optical element according to claim 1, wherein said minute uneven structure has periodicity.

3. The diffractive optical element according to claim 2, wherein the period of said minute uneven structure is substantially constant.

4. The diffractive optical element according to claim 2, wherein said minute uneven structure has periodicity in a direction parallel to a direction in which the diffraction grating on which it is formed extends.

5. The diffractive optical element according to claim 1, wherein areas in which said minute uneven structure is not formed exist near the end portions of gratings constituting said diffraction gratings.

6. The diffractive optical element according to claim 1, wherein said wavelength used is any wavelength within the entire region of visible light.

7. The diffractive optical element according to claim 1, wherein said minute uneven structure has an anti-reflection function.

8. An optical apparatus provided with the diffractive optical element according to claim 1.

* * * * *

UNITED STATES PATENT AND TRADEMARK OFFICE
CERTIFICATE OF CORRECTION

PATENT NO. : 6,650,477 B2
DATED : November 18, 2003
INVENTOR(S) : Takehiko Nakai It is certified that error appears in the above-identified patent and that said Letters Patent is hereby corrected as shown below:

Column 3,
Line 40, "optical 3" should read -- optical part 3 --.

Signed and Sealed this

Twenty-ninth Day of June, 2004

JON W. DUDAS
*Acting Director of the United States Patent and Trademark Office*